Figure 1:
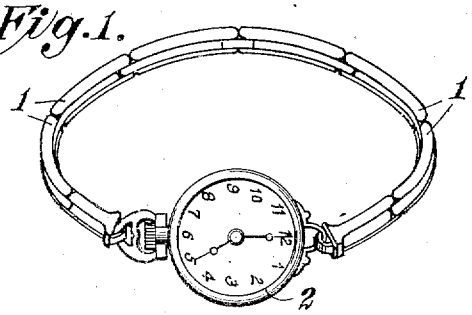

C. L. DEPOLLIER & E. C. DUNCUFF.

EXPANSIBLE WATCH BRACELET.

APPLICATION FILED DEC. 17, 1914.

Reissued July 27, 1915. 13,951.

13

WITNESSES:

Geo. Schwartz.

Francis J. Murphy

INVENTORS

Charles L. Depollier and Edward C. Duncuff

BY

Redding, Greeley & Goodlett

ATTORNEYS

UNITED STATES PATENT OFFICE.

CHARLES L. DEPOLLIER, OF NEW YORK, AND EDWARD CRUZELL DUNCUFF, OF MOUNT VERNON, NEW YORK, ASSIGNORS TO DUBOIS WATCH CASE COMPANY, OF BROOKLYN, NEW YORK, A CORPORATION OF NEW YORK.

EXPANSIBLE WATCH-BRACELET.

13,951. Specification of Reissued Letters Patent. Reissued July 27, 1915.

Original No. 1,113,885, dated October 13, 1914, Serial No. 817,745. Application for reissue filed December 17, 1914. Serial No. 877,826.

*To all whom it may concern:*

Be it known that we, CHARLES L. DEPOLLIER and EDWARD C. DUNCUFF, citizens of the United States, residing, respectively, in the borough of Brooklyn, of the city of New York, in the State of New York, and in the city of Mount Vernon, in the county of Westchester and State of New York, have invented certain new and useful Improvements in Expansible Watch-Bracelets, of which the following is a specification.

The main object of this invention is to provide a sliding link for a bracelet, which link may be easily and readily manipulated so as to increase the size of the bracelet to facilitate its being passed over the hand and on to the wrist and then manipulated so as to bring the bracelet back to its normal size when it may be fastened.

Another object of the invention is to provide an expansible sliding link which includes a hook without the use of a spring, which would increase the size of the bracelet, so as to facilitate the sliding of the bracelet over the hand without unhooking the watch, since as heretofore many bracelets have been damaged or broken apart, owing to the stretching that is necessary to expand the same sufficiently to allow the bracelet to slide over the hand before reaching the wrist, and it is well known that the ordinary expansion bracelet does not possess sufficient expansion to allow the bracelet to readily slip over the hand. Further, our improved hook link permits the watch to be readily detached entirely from the bracelet and to be worn as an ordinary watch.

A further object of this invention is to furnish an expansible link comprising a hook which locks itself, said hook having projections at each side thereof at one end adapted to slide within another link provided with grooved side pieces, said grooved side pieces being connected at one end by a member which covers the end of the hook when the link is closed thereby adding security to the hook and leaving no projecting point to come in contact with the wearing apparel when either opened or closed.

A still further object of the invention is to provide securing means which can be utilized in any part of the bracelet to furnish the increased expansion, and allow of its being detached thereby separating the bracelet in any part as may be desired by the wearer.

The foregoing and such other objects as may occur from the ensuing description are attained by the construction, combination, arrangement and location of the parts hereinafter more fully described, illustrated in the accompanying drawings forming a part of this specification, and particularly pointed out in the claims appended hereto.

Figure 6:
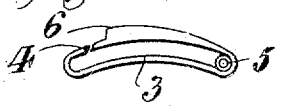
Figure 7:
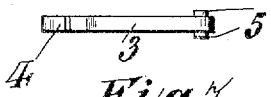
Figure 2:
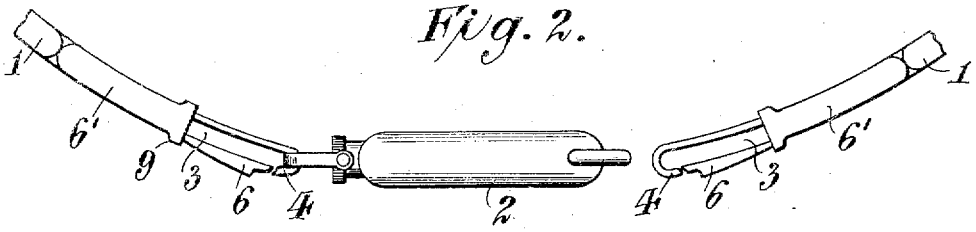
Figure 5:
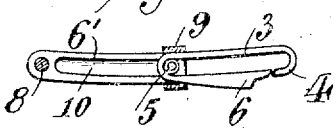
Figure 3:
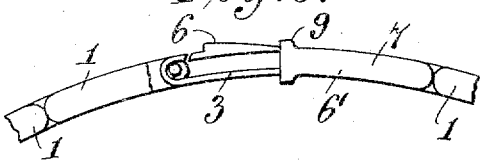
Figure 9:
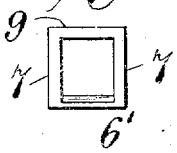
Figure 4:
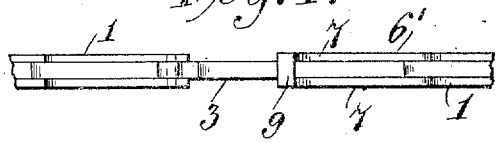
Figure 8:
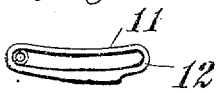

With reference to the drawings:—Figure 1 is a perspective view of an expansible watch bracelet embodying our invention. Fig. 2 is an edge view of a portion of the bracelet showing one end of the bracelet hooked to the watch and the other end detached therefrom. Fig. 3 is a side view of a portion of the bracelet showing the expansible securing means located intermediate the bracelet. Fig. 4 is an edge view of the structure shown in Fig. 3. Fig. 5 is a longitudinal sectional view through our improved securing means showing the hook in full lines. Fig. 6 is a side view of the hook portion of the securing means. Fig. 7 is a top plan view of the structure shown in Fig. 6. Fig. 8 is a side view showing a slightly modified form of a portion of the securing means without the hook, and Fig. 9 is an enlarged front elevation of the forward end of that portion of the securing means which carries the hook.

In the several views of the drawings similar characters of reference are employed to designate like or the same parts throughout where they occur, wherein—1, designates the links of an expansible bracelet, and 2, the watch to which the bracelet is attached at each end thereof.

By reference to Fig. 1 of the drawings it will be seen that the watch is secured at each end of the bracelet by our improved securing means which consists of an expansible structure without springs and is composed of two pieces or link members, one member consisting of an open hook link 3 separated at an incline to the direction of its length near the forward end thereof to form a hook portion 4, the other end being provided at each side thereof with a projection 5, and the upper portion being inclined upwardly and forwardly to form a hump portion 6 for the purpose hereinafter described. The other member 6′ of the expansible securing structure consists of two side pieces 7 secured at one end by a pin 8 and at its forward end by a top and bottom piece brazed or otherwise secured together to form an integral end portion 9 substantially as shown in Fig. 9. In each side portion 7 the inner wall is provided with a longitudinal groove 10 adapted to receive the projections 5 thus serving to retain the link 3 between said side pieces, thereby preventing said link from getting out, and acting as a guide for the reciprocating movement of the side pieces, when moved back and forth over the link 3.

The forward upper end portion 9 of the member 6′ is so constructed that it allows the hump portion 6 of the hook to pass thereunder, and when member 6′ is slid to its forward position said end portion 9 will rest in front of the hump portion 6 and cover the end of the hook thereby closing the hook portion thus adding to its security and leaving no projecting point to come in contact with wearing apparel, hence when the expansible link is closed the hook is protected by the top piece of the member 6′.

In Fig. 8 of the drawings is shown a solid member 11 constituting one portion of the expansible structure, this member 11 being in one piece, the forward end portion 12 being of such a resilient character that by pressing downward on the hump portion 13 the top piece of the member 6′ may be readily released and slid in a rearward direction to expand the structure and increase the size of the bracelet.

It will be readily understood that when the parts constituting our improved expansible securing means at each end of the bracelet are in closed position the top piece on the forward end of the member 6′ rests in front of the hump portion on the open link hook member 3, and covers the end of the hook and by merely pressing downward on the hump portion member 6′ is released and caused to move rearwardly thus opening the structure and materially increasing the size of the bracelet, then by pushing the member 6′ in a forward direction until it rides over the hump portion it will snap behind said hump portion thereby closing the hook and reducing the bracelet to its normal size, holding the relatively sliding members of the link positively in their contracted relation.

It will be observed that by attaching the expansible securing means hereinbefore described to each end of the expansible bracelet, such as shown in Fig. 1, the size of the bracelet can be readily increased in excess of its normal expansion to facilitate it being readily passed over the hand, and by the closing and locking of said means the added increase in the size of the bracelet is reduced sufficiently to hold the watch snugly on the wrist of the wearer.

It will be perceived that slight changes in the precise details of construction may be resorted to without departing from the spirit of our invention.

Having thus described our invention what we claim and desire to secure by Letters Patent is:—

1. A device for securing a watch to an expansible bracelet at each end thereof, comprising an expansible link structure consisting of two interengaged members slidable in relation to each other, one member being composed of an open link having a resilient upper portion provided with a hump and having a hook at one end, and another member composed of two side pieces connected together at each end, one end having an outwardly projecting portion adapted to slide over said hump and rest in front thereof to lock said hook when the structure is in its contracted position.

2. A device for securing a bracelet together at any intermediate portion thereof, comprising an expansible link structure consisting of two interengaged members slidable in relation to each other, one member being an open link separated on a diagonal line at its forward end to form a hook, the ends of the link on opposite sides of the diagonal line being overlapped, and having a resilient upper portion provided with a hump and adapted to open and close said hook, and another member composed of two side pieces connected together at one end and the other end of said side pieces being connected by an outwardly projecting portion adapted to slide over said hump and rest in contact with the front thereof to close and lock said hook when the link structure is in closed position.

3. A device for securing a watch to an expansible bracelet, comprising an expansible link structure composed of two link interengaged members slidable in relation to each other, one member consisting of an open link having a hook at one end thereof and provided with an upper resilient portion, the other member having means at one end thereof for locking said hook and resilient member for the purpose set forth.

4. In an expansion bracelet, the combination with expansion links, of a link composed of two relatively slidable members, and means whereby such relatively slidable members can be locked positively in their contracted relation.

5. In an expansion bracelet, the combination with expansion links, of a link composed of two relatively slidable members, one of such members forming a hook, and means whereby such relatively slidable members can be locked positively in their contracted relation.

6. In an expansion bracelet, the combination with expansion links, of a link composed of two interlocked, relatively slidable members, and means whereby such relatively slidable members can be locked positively in their contracted relation.

7. In an expansion bracelet, the combination with expansion links, of a link composed of two relatively slidable members, one of such members forming a hook and the other of such members having provisions to close said hook when said members are in their contracted relation, and means whereby such relatively slidable members can be locked positively in their contracted relation.

This specification signed and witnessed this 14th day of December A. D., 1914.

CHARLES L. DEPOLLIER.
EDWARD CRUZELL DUNCUFF.

Signed in the presence of—
W. B. GREELEY,
WORTHINGTON CAMPBELL.